United States Patent [19]
Hansen

[11] 3,751,612
[45] Aug. 7, 1973

[54] SNAP ACTION CAPACITIVE TYPE SWITCH
[75] Inventor: Wray C. Hansen, Arvada, Colo.
[73] Assignee: Colorado Instruments, Inc., Broomfield, Colo.
[22] Filed: Aug. 30, 1971
[21] Appl. No.: 175,941

[52] U.S. Cl. ... 200/52 R, 200/DIG. 1, 200/166 BH, 179/100.41 B, 307/88 ET, 317/249 R
[51] Int. Cl. ...................... H01h 35/00, G08c 5/00
[58] Field of Search .................. 179/100.41 B, 90 R; 200/DIG. 1, 159 B, 181, 52 R, 166 BH; 317/249 R; 307/88 ET

[56]  References Cited
UNITED STATES PATENTS

| 2,262,777 | 11/1941 | Roper | 200/159 B |
|---|---|---|---|
| 3,503,031 | 3/1970 | Nyhus et al. | 200/DIG. 1 |
| 3,643,041 | 2/1972 | Jackson | 200/DIG. 1 |
| 3,653,038 | 3/1972 | Webb et al. | 307/88 ET |
| 3,659,163 | 4/1972 | Borisov et al. | 200/181 X |
| 3,668,417 | 6/1972 | Sessler et al. | 307/88 ET X |

Primary Examiner—J. R. Scott
Attorney—Gary D. Fields et al.

[57]  ABSTRACT

Electrical signaling device in the form of a capacitor or condenser having a fixed plate and a generally dome-shaped snap action plate which may be deformed toward the fixed plate, wherein the dome-shaped plate, when in its normal or relaxed state, is in the form of a hollow geometric solid having an open polygonal base with a planar side wall extending from each side of the base at equal angles thereto toward each other and are joined by an arcuate surface, the base having arcuate corners bent to extend from the opposite side of the base as the side walls. When the number of sides equals three, it has a base which has the general shape of an equilateral triangle with apexes which are arcuate, the latter being bent angularly to the general plane of the plate, forming abutments which resist the deforming force applied to the dome-shaped plate.

7 Claims, 9 Drawing Figures

PATENTED AUG 7 1973          3,751,612

INVENTOR
WRAY C. HANSEN
BY Sheridan, Ross + Fields
ATTORNEYS

SNAP ACTION CAPACITIVE TYPE SWITCH

BACKGROUND OF THE INVENTION

Application of James R. Webb and Richard C. Webb, for "Capacitive Electrical Signal Device and Keyboard Using Said Device", Ser. No. 13,091, filed Feb. 20, 1970, which issued on Mar. 28, 1972, as U. S. Pat. No. 3,653,038, discloses an electric signal device of a capacitive nature. A metallic target which may or may not have a permanently charged dielectric material mounted on its upper surface is located beneath a semi-hemispherical dome spring. Located above the dome spring is a push button or key element which, when depressed, changes the separation distance between the dome spring and the target in a "snap" action manner. This action causes a rapid decrease in the voltage between the target and the dome spring which decrease is in the form of a signal pulse. Such application also discloses splitting the target into two or more segments and connecting the segments to a plurality of electrical signal devices in a matrix arrangement. The keys or push button elements are mounted in a keyboard arrangement such that when individual keys are depressed, coded symbols which represent information about the depressed key are generated. The coded symbols are suitable for direct entry into digital data systems, displays and/or computers.

SUMMARY OF THE INVENTION

This invention contemplates the utilization of all features of the application just referred to which are applicable thereto and differs therefrom by certain features, including;

a. The shape and construction of the dome spring which, rather than being in the form of a circular disk, is in the form of a hollow geometric solid having an open polygonal base with a planar side wall extending from each side of the base at equal angles thereto toward each other and are joined by an arcuate surface, the base having arcuate corners bent to extend from the opposite side of the base as the side walls. Two distinct advantages accrue from this novel construction. First, a more rapid snap-through of the movable plate is obtained than is possible with the conventional dome shape and the clearance provided under the side walls between the arcuate corners allows for the escape of air under the dome during the snap-through thereof to provide a more rapid change in plate spacing. It is the rate of change in the capacitive spacing which creates a usable output signal. In one form of the invention, the spring has a base in the shape of an equilateral triangle (delta shaped), the regions at the apexes being circular. These regions are bent at an angle to the general plane of the spring, forming a three point support which resists the deforming force applied to the spring. It, like the circular disk referred to, is of the snap action type, which returns to its original shape when the deforming force is discontinued. Portions of the spring extending from the edges of the base and toward the geometrical center of the spring are substantially flat and are joined by spherical portions, b. when a plurality of targets are employed for each spring, they are preferably in the form of concentric rings, rather than pie-shaped segments, as disclosed in the application referred to, c. the major area of one face of the dome spring is preferably attached directly to one end of a cylindrical resilient member carried by a push button key element, as by cementing. Such resilient member is preferably constructed of sponge-like material, exemplary of which is polyurethane, and d. each switch is formed as an individual module comprising a square parallelepiped housing, a key or button slidable therein, its attached cylindrical spring of foam material and the dome spring cemented to the latter. The modules may be disposed in abutting relation, or spaced as desired, on a printed circuit board which is formed with targets in desired positons thereon.

DESCRIPTION OF PREFERRED EMBODIMENTS

Figure 1:
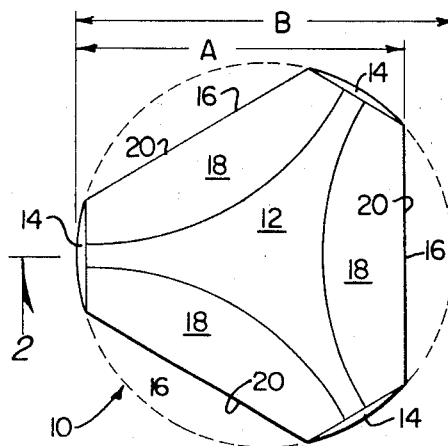
FIG. 1 is a plan of a punch for making a dome spring.
Figure 2:
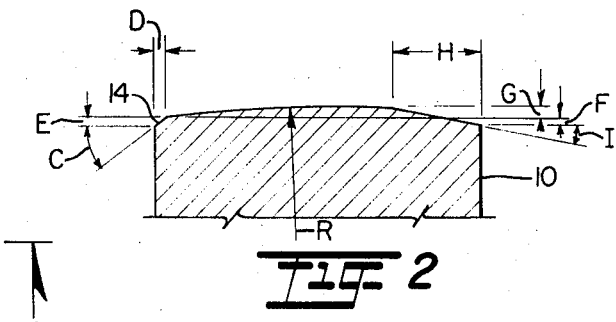
FIG. 2 is a section taken on line 2—2, FIG. 1.
Figure 3:
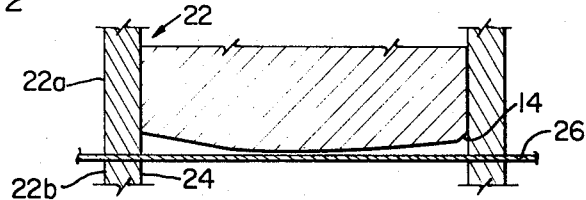
FIG. 3 is a section like FIG. 2, illustrating the die with which the punch cooperates.
Figure 4:
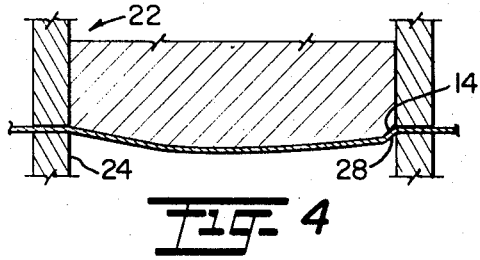
FIG. 4 is a section like FIG. 3, illustrating progress of movement of the punch into the die.
Figure 5:
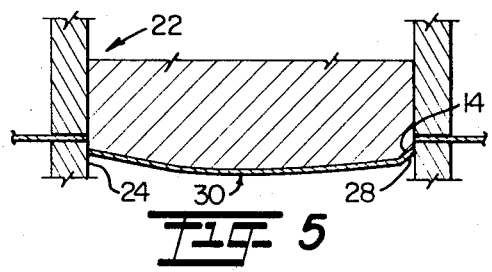
FIG. 5 is another section of FIGS. 3 and 4, illustrating further progress of movement of the punch into the die.

The shape of a preferred form of the dome spring, which forms one of the more important features of the invention, may be best understood by a description of the apparatus and method of making same, with reference to FIGS. 1-5.

Punch 10 may be formed of cylindrical rod with one end machined to a spherical surface 12 having a radius R. A circular chamfer 14 is then formed at the periphery of the spehrical radius and the punch is then machined to the cross section shown in FIG. 1, that is, by machining it to provide three flats 16 at equal angles to each other. Three portions of the spherical end are then machined to form flat surfaces 18 which form three straight edges 20 with flats 16 and intersect with spherical surface 12. These edges 20 are disposed slightly below the plane of the outermost edge of chamfer 14.

The die 22 is formed with a parallelepiped aperture 24 of a shape corresponding to the cross-sectional shape of the punch but differs from many conventional blanking dies in that it is formed of two aligned portions 22a, 22b between which flat stock 26 may be clamped around the periphery of the punch and die aperture.

In the formation of the dome spring, flat stock 26 is immovably clamped between dies 22a,22b so that it cannot deform in the radial direction of the punch and die. As the punch advances toward the blank, its central portion first contacts the blank (FIG. 3), commencing its deformation to corresponding shape. The flat portions 18 next engage the blank and deform it to corresponding shape. As this continues, the three chamfers engage the blank (FIG. 4) forming three downturned feet or abutments 28. Slight further motion starts the shear of these feet, deformation of the spherical and adjacent flats continuing. When complete shear occurs (FIG. 5) the spherical and flat portions have been deformed to their final shape. The three straight edges of the punch then engage the blank in the conventional manner of blanking punches and shear the spring 30 to the shape illustrated in FIG. 1 which is in the form of a hollow geometric solid having an open polyagonal base, such as triangular, with planar side walls extending from each side of the base at equal angles thereto toward each other are joined by an arcuate surface, such as sperical. Each of the three feet 28, bent angularly to the general plane of the spring, bridges a tip of the spherical portion and the outer portions of adjacent flats 18, forming three reinforced zones and about which the general plane of the spring may buckle to its snap-over position by application of a force to its upper or convex surface, the spring returning to its normal position, upon removal of the buckling force. It will be understood that the punch may be constructed to form a spring having a polyagonal base with more than three sides, if desired.

To better enable those skilled in the art to practice the invention without experimentation, the following dimensions and specifications are set forth:

|  | R = 4.900'' | G = 0.016'' |
|---|---|---|
|  | A = 0.570'' | H = 0.165'' |
|  | B = 0.650'' | Angle I = 10° |
| angle | C = 36° 30' | Depressing Force = 70–90 grams |
|  | D = 0.018'' |  |
|  | E = 0.011'' |  |
|  | F = 0.14'' |  |

Material: stainless steel, No. 302, full hard, 0.0023 ± 0.002 inch thick, tensile strength 180,000 psi, yield strength 140,000 psi, 45 Rockwell C.

As will be apparent from the above, since E and F differ by 0.003 inch and the stock is approximately 0.025 inch shearing of the three chordal sides commences about the same time that complete shearing of the feet is completed. It will, of course, be understood that the entire forming and shearing operations occur in a fraction of a second, as is conventional in punch press operation.

Figure 6:
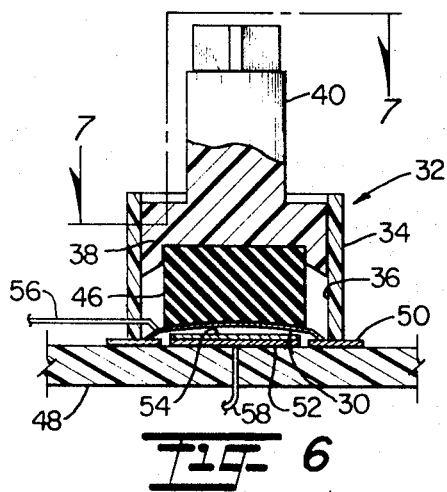
FIG. 6 is a central section of a module, taken on line 6—6, FIG. 7.
Figure 7:
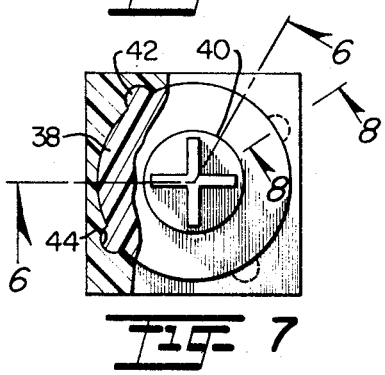
FIG. 7 is a top plan and section taken on line 7—7, FIG. 6.
Figure 8:
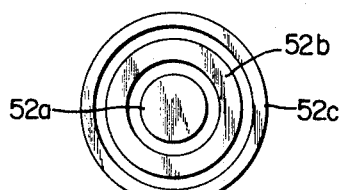
FIG. 8 is a section taken on line 8—8, FIG. 7.

Referring now to FIG. 6, module 32 comprises a square housing 34 having a cylindrical bore 36 therein which slidably receives a cylindrical flange 38 formed integrally with push button 40. Projections 42 (FIG. 7) engage in grooves 44 to prevent rotation of the button relative to the housing. Cylindrical spring 46 of foam material, such as polyurethane, is received within cylindrical flange 38 and engages dome spring 30 at the opposite end.

Circuit board 48 is of conventional construction formed of dielectric material which has been clad with metal 50, such as copper, and etched to provide desired circuitry which includes a conductive means such as fixed condenser target plate 52. This may be coated with suitable material 54, forming an electret, as fully disclosed in the application referred to and which, per se, forms no part of the present invention. Conveniently movable plate 30 is connected to an output lead 56 and stationary plate or target is connected to a second output lead 58 for providing an output signal when push button 40 is depressed in a manner described in above-mentioned U.S. Pat. No. 3,653,038.

Figure 9:
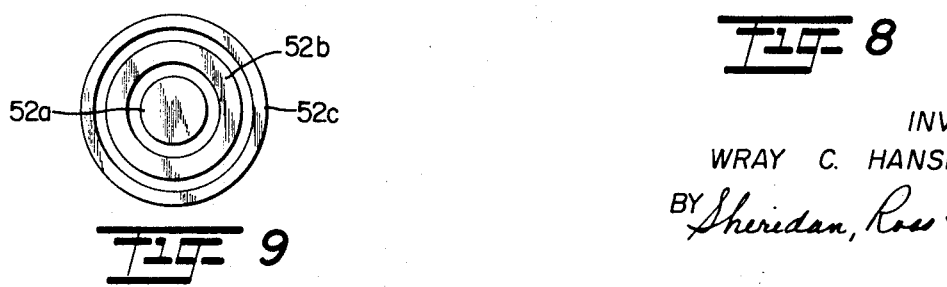
FIG. 9 is a plan of an alternative form of target.

FIG. 9 illustrates an alternative form of fixed target comprising a central element or plate 52a and concentric ring-shaped elements or plates 52b, 52c. The advantage of this construction over the pie-shaped segments referred to resides in the generation of more uniform signals. This may be better understood if it is assumed that the symmetry of collapse of a dome spring may vary slightly during its successive operations. If it varies with the use of segmental targets, then the spacing and capacitance between each segment and the spring will also vary. If the symmetry of collapse varies with concentric targets, however, the average spacing of the plates remains substantially constant, thus producing substantially uniform signals.

As so far described, areas 18 are flat and the arcuate zone 12 therebetween is of spherical radius. In the absence of extensive experimentation it cannot be definitely stated exactly how critical these shapes are. For example, the flat shape might depart somewhat from an exact flat surface and the spherical zone might depart somewhat from an exact spherical radius. It is thus contemplated, within the purview of the invention, that the language of the appended claims be constructed within the purview of the concepts of the invention, rather than their precise definitions, as set forth by dictionary definitions.

What is claimed is:

1. A curved snap-action movable sheet metal spring plate for a snap-action switch, said spring plate being in the form of a hollow geometric solid connectable to circuitry responsive to the snap-action switch, said spring plate comprising:
    an open polyagonal base having a plurality of sides;
    a plurality of planar side walls, one of said side walls extending from each side of said base at equal angles thereto and toward each other;
    an arcuate surface interconnecting said side walls; and
    an arcuate corner interconnecting each pair of adjacent sides of said base and being bent to extend from said sides of said base in a direction generally opposite to said side walls.

2. A movable spring plate, as claimed in claim 1, wherein:
    said polygonal base is triangular; and
    said arcuate base is spherical.

3. A snap-action switch comprising a curved spring plate as defined in claim 1 and further including:
    a flat stationary plate conductive means positioned adjacent to and spaced from said curved spring plate, said curved spring plate and stationary plate conductive means being connectable to circuitry responsive to a decrease in the spacing of said curved spring plate and stationary plate conductive means to provide an output signal.

4. A snap-action switch, as claimed in claim 3, wherein said stationary plate conductive means includes.
    a circular element adjacent to and spaced from said movable plate; and
    a ring-shaped element concentrically disposed with respect to said circular element, said circular element and said ring-shaped element being connectable to separate circuitry, each responsive to a decrease in spacing with respect to said curved spring plate to provide respective output signals.

5. A snap-action switch for supplying signals to a circuit, said switch comprising:
    a flat stationary target conductive means connectable to circuitry responsive to said switch;
    a curved movable conductive plate in the form of a hollow geometric solid connectable to the circuitry to provide an output signal thereto, said movable conductive plate including:

an open polygonal base having a plurality of sides;

a plurality of planar side walls, one of said side walls extending from each side of said base at equal angles thereto toward each other;

an arcuate surface interconnecting said side walls; and an arcuate corner interconnecting each pair of adjacent sides of said base and being bent to extend from said sides of said base in a direction generally opposite to said side walls, said corners supporting said movable conductive plate adjacent said target conductive means and spaced therefrom; and means for applying pressure to said arcuate surface of said curved movable conductive plate to abruptly decrease the distance between said curved movable conductive plate and said flat stationary target conductive means to provide a signal to the circuitry in resonse to said decrease in distance.

6. A snap-action switch, as claimed in claim 5, wherein said flat stationary target conductive means includes:

a layer of electret material on the side of the flat plate facing said curved plate.

7. A snap-action switch, as claimed in claim 5, wherein:

said polygonal base is triangular; and
said arcuate surface is spherical.

* * * * *